United States Patent [19]

Mole

[11] Patent Number: 5,257,549

[45] Date of Patent: Nov. 2, 1993

[54] VARIABLE RANGE LOAD CELL SYSTEM AND METHOD OF APPLICATION

[75] Inventor: Philip J. Mole, San Diego, Calif.

[73] Assignee: Lockheed Corporation, Fort Worth, Tex.

[21] Appl. No.: 729,273

[22] Filed: Jul. 12, 1991

[51] Int. Cl.⁵ .............................................. G01L 1/00
[52] U.S. Cl. ........................... 73/862.392; 73/862.382
[58] Field of Search ....................... 73/862.52, 862.633, 73/862.59, 862.626, 862.391, 862.392; 177/147

[56] References Cited

U.S. PATENT DOCUMENTS

| | | | |
|---|---|---|---|
| 2,157,723 | 5/1939 | Wilson | 73/862.392 |
| 2,570,321 | 10/1951 | Christoffer | 73/862.391 |
| 2,582,886 | 1/1952 | Ruge | 338/5 |
| 2,588,387 | 3/1952 | Hughes | 73/862.391 |
| 3,121,328 | 2/1964 | Todd et al. | 73/862.392 |
| 4,113,040 | 9/1978 | Storace | 177/211 |
| 4,586,388 | 5/1986 | Tanaka et al. | 73/862.52 |

Primary Examiner—Richard E. Chilcot, Jr.
Assistant Examiner—Ronald L. Biegel
Attorney, Agent, or Firm—Frank D. Gilliam; John R. Duncan

[57] ABSTRACT

A variable load cell arrangement operative for precisely measuring loads over a range beyond the range of a single conventional single low range load cell. The arrangement includes a low range measuring element positioned in a case and having one end adapted to be connected through the case to a load and the opposing end coupled to a fixed reference. A variable pressure means, such as a controllable bellows, is interposed in the case between the load element and an end of the case whereby a predetermined force may be selectively applied to the load measuring element in a direction opposing the load to relieve the strain on the element and permit it to continue to function in an extended range. Electrical circuits, including Wheatstone bridges, are coupled to the load measuring element and provide an electrical output indicative of the applied load and an electrical output that is used to control the variable pressure means.

16 Claims, 2 Drawing Sheets

VARIABLE RANGE LOAD CELL SYSTEM AND METHOD OF APPLICATION

BACKGROUND OF THE INVENTION

1. Field of the Invention

This invention relates to an improvement in a load cell arrangement for precisely measuring loads applied to a measuring element contained within a protective case and more particularly, but not by way of limitation, to a load cell arrangement which precisely measures loads over a variable range which extends beyond the range of a conventional single range low load cell.

2. Description of the Prior Art

In the art of testing it is known to apply a variety of loads to a test subject and to measure the reaction, sometimes to destruction. There are known standard single range load cells which are devices capable of measuring loads applied to a measuring element contained within a protective case. The load cell measuring elements normally use strain gages for sensing the load applied, but other methods including induction, capacitance, magnetism and mechanical dial indicators are used. Load cells are used for measuring a single load or force applied in tension or compression very accurately. Such load cells are used extensively for measuring loads applied to various structures, weighing of many items, loads applied during production machining operations, wind tunnel testing, and numerous other applications.

The load cell maximum capacities vary from ounces to many tons. The accuracy of the measurements are based on the maximum load capacity of the load cell. The standard load cell accuracy for test applications is 0.10% to 0.50% of full load. To maintain accuracy through a large load range requires installing many different capacity load cells, in sequence which is very expensive and time consuming. As an example, at one-tenth of the maximum load the standard load cell would produce accuracies of 1.05% to 5.0% of the measured load. Thus, it is apparent that a need exists for a variable load cell arrangement that will reduce the number of load cells required for accurate data the entire desired test range and that will produce accurate data over the entire test load range, especially at the low load or near zero load portion of the range where it is impossible with the present day load cell designs.

It is believed that the present invention represents a major advance in load cell arrangements and satisfies the above objectives. An example of an application where the present invention may be used to advantage is seen in U.S. Pat. No. 4,920,791 which shows a wind tunnel model support and attitude control for wind tunnel testing. The present invention will allow the preload in the vanes of the model support system to be removed from the measuring elements, as a result only the variations in the vane loads due to the model air loads would be measured.

SUMMARY OF THE INVENTION

Briefly stated, the presently preferred embodiments of the invention contemplate a load cell arrangement which is operative for precisely measuring loads over a range beyond the range of a single conventional single low range load cell and which includes a hollow case having a load measuring element positioned therewithin. The load measuring element has one end adapted to extend through the case to be connected to a load and having an opposing end adapted to be coupled to a fixed reference. A load transfer means is connected to the opposing end of the load measuring element and couples the load measuring element to the fixed reference. A variable force means is interposed within the case and between the case and the load measuring element whereby a predetermined force may be selectively applied between the load trans means and the case to relieve the load exerted upon the load measuring element and permit it to measure a load over an extended range which is greater that the load range of the load measuring element.

The load measuring element is provided with suitable strain gages which provide outputs to Wheatstone bridges for indicating the test load that has been applied to the load cell and for causing the variable force means, which in the preferred embodiments is a pressure bellows, to exert a pressure counter to the load when the test load exceeds the load range of the load cell thereby permitting the load cell to function beyond its normal range yet with low load accuracy.

Further advantages of the invention will be evident from the detailed description, when read in conjunction with the accompanying drawings which illustrate preferred embodiments of the invention.

DESCRIPTION OF THE PREFERRED EMBODIMENTS

Figure 1:
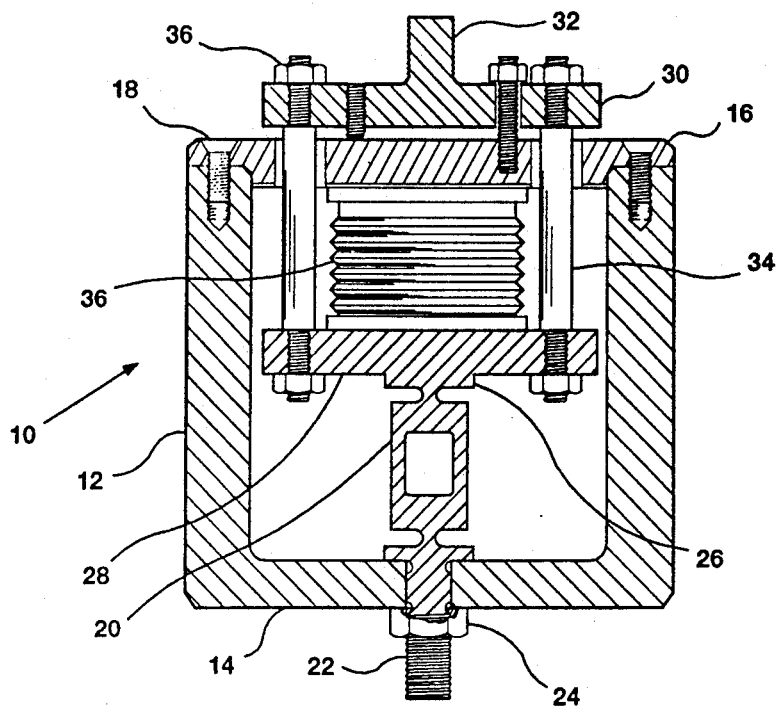
FIG. 1 is a cross section of a load cell measuring arrangement constructed in accordance with a preferred embodiment of the invention.

Referring to the drawings in detail, and particularly to FIG. 1, reference character 10 generally designates a load cell arrangement that is constructed in accordance with a first preferred embodiment of the present invention. The load cell 10 includes a hollow case 12 having a closed end 14 and an opposing open end that is closed by a suitable end cap 16 that is secured to the case 12 by any suitable means such as screws 18. A suitable load measuring element 20 is positioned within the case 12 and has one end 22 that extends through the case 12 for attachment in any suitable manner to a test load that may be either tensile or compressive. The end 22 of the load measuring element 20 may be secured to the case by a suitable nut 24 or other means. The other end 26 of the load measuring element 20 is provided with an enlarged face portion 28. The face portion 28 is coupled to a load adapter plate 30 that is provided with a upstanding portion 32 adapted to secured to a fixed reference in any suitable manner.

The coupling of the face portion 28 to the load adapter 30 is accomplished by a plurality of load transfer rods 34 that are secured at one end the face portion 20 and at their opposing end to the load adapter plate 30. A variable pressure means is interposed between the end cap 18 of the case 12 and the face portion 28 of the measuring element 20. This variable force means may take the form of a pneumatic bellows 36 which applies a selective predetermined pressure between the end 28 of the load measuring element 20 ant the end cap 16 of the case 12 in response to loads sensed by the load measuring element 20 in a manner which will be set forth more clearly hereinafter. A plurality of lock out screws 36 or limiting screws extend longitudinally from the load adapter plate 30 into contact with the end cap 16 to limit the travel of the end face 28 toward the end cap 16 in the event of the failure of the force bellows 36 or other unforeseen event.

Figure 2:
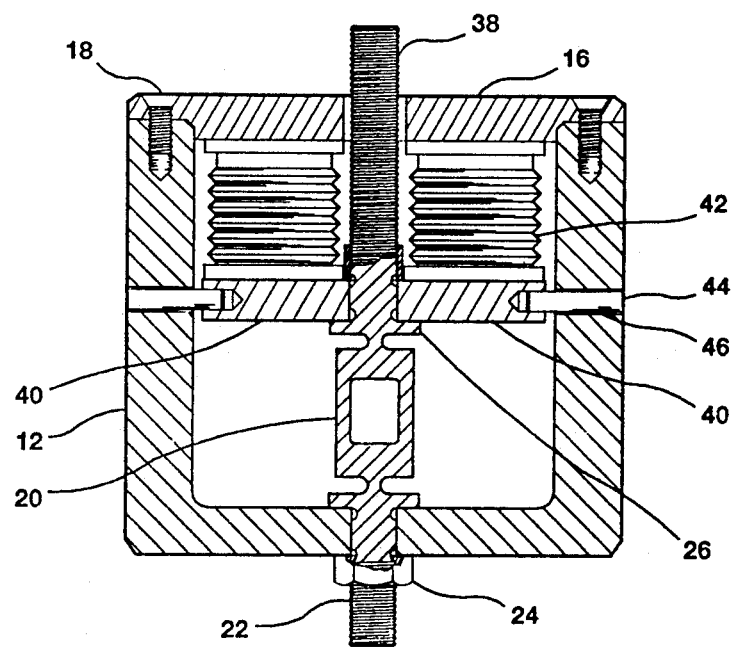
FIG 2 is a sectional of a second embodiment of the load cell measuring arrangement.

Referring now to FIG. 2, a second preferred embodiment of the invention is illustrated like numerals indication like structure to that seen in FIG. 1. In this embodiment of the invention the end 26 of the load measuring element is provided with a longitudinally extending portion 38 which extends through the end cap 16 for attachment to a fixed reference. A load transfer plate 40 is secured on the extend portion 38 of the load measuring element 20 within the case 12 in any suitable manner.

A plurality of force bellows are interposed between the load transfer plate 40 and the end cap 16 for the purpose of applying a counter pressure to that force exerted on the load measuring element 20 by a test load in the test load were to exceed the load range of the load cell 10. A plurality of lock out or limiting pins 44 are loosely disposed in apertures 46 in the sides of the case 12 and extend into the load adapter plate 40 for providing for the safety of the load measuring element 20 in the event of an unexpected event.

Figure 3:
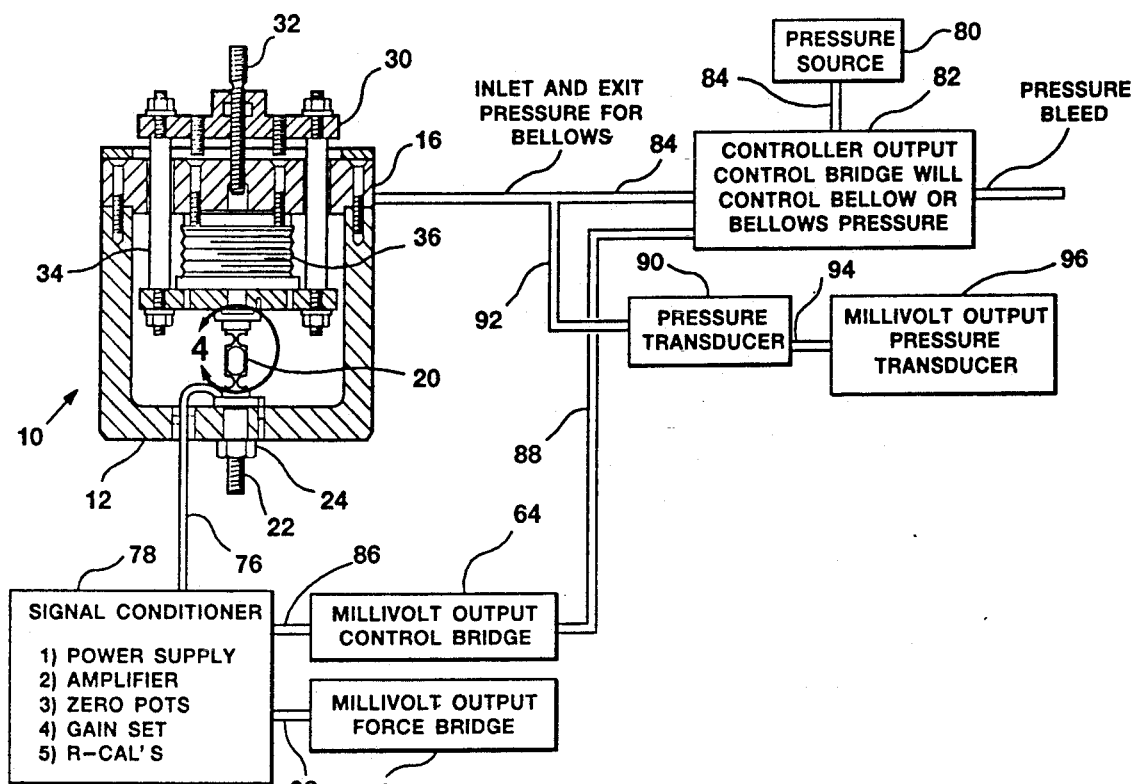
FIG. 3 is a schematic of the electrical and pneumatic system that cooperates with the load cell measuring arrangement of FIG. 1.
Figure 4:
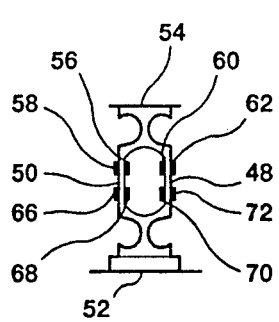
FIG. 4 is a schematic detail view of the load measuring element used in the load cell arrangement of FIG. 1 and illustrating of the strain gages on the element.
Figure 5:
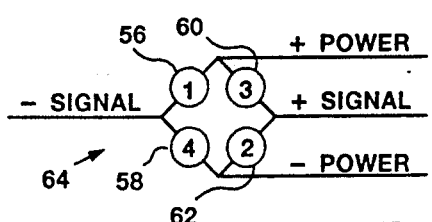
FIG. 5 is a schematic of a Wheatstone bridge coupled to certain strain on the load measuring element.
Figure 6:
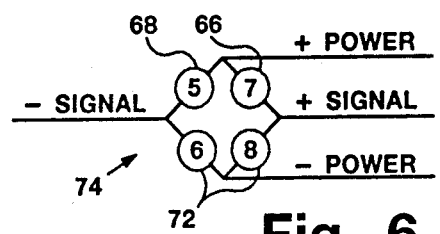
FIG. 6 is a schematic of a Wheatstone bridge coupled to other stain gages on the load measuring element.

In FIG. 3 it will be seen how the load cell of FIG. 1 may be incorporated into complementary electrical and pneumatic systems for accurately measuring variable test loads extending over a range beyond that of a single low range load cell. The load cell 10 is coupled at one end 22 to a test load and at its opposing end 32 to a fixed reference shown generally by the dotted line. Examining for the moment the load measuring element 20 in more detail in FIG. 4, it will be seen that the load measuring element 20 is provided with two bifurcated members 48 and 50 which extend longitudinally between the portions 52 and 54 that are extend to the load and fixed ends respectively. Suitable strain gages 56 and 58 are suitably affixed to member 50 and strain gages 60 and 62 are affixed to the member 48. These strain gages 56, 58, 60 and 62 provide the load elements in a Wheatstone bridge 64, as seen in FIG. 5, to provide a suitable electrical output. The Wheatstone bridge circuit of FIG. 5 will not be shown in detail since such circuits are well known in the art.

Similarly, strain gages 66 and 68 are affixed to member 50 of the load measuring element 20 and strain gages 70 and 72 are affixed to member 48. The strain gages 66,68,70, and 72 are arranged in a suitable Wheatstone bridge circuit 74 for providing an electrical output. The outputs of the Wheatstone bridge circuits 64 and 74 are coupled by suitable cable means 76 a suitable electrical signal conditioning means 78 which, for example, includes a power supply, amplifier, zero pots, and other electrical means which are well known in the art and are not shown here in detail for ease of illustration.

A pneumatic pressure source 80 is coupled to a suitable controller 82 by conduit 84. The controller 82 provides a conduit connection 84 to the bellows 36 for selectively supplying pressurized air to the bellows 36. The outputs of the strain gages 56, 58,60, and 62 after being conditioned by the signal conditioner means 78 are applied to the bridge 64 through cable 86. The bridge control circuit 64 provides a control signal by cable 88 to the controller 82 for controlling the pressure to be applied to the force bellows 36.

A pressure transducer 90 is connected through conduit 92 to conduit 84 for sensing the pressure of the fluid within conduit 84. This transducer 90 provides an output via cable 94 to a suitable output means 96 which indicates the pressure within conduit 84.

The strain gages 66, 68, 70 and 72 provide outputs that after being conditioned by the signal conditioner means 78 are coupled by cable means 98 to the legs of the bridge 74 and provide an output indicative of the load that has been applied to the load cell 10.

In operation, when a test load is applied to the load cell 10 which is within the load range of the low range measuring element 20 with a concomitant accuracy the value of the load is indicated by bridge 74. In the event that the load begins to approach the functional range of the measuring element 20 the output of the bridge 64 applied to the controller 82 is utilized thereby to determine the pressure that should be allowed to flow from the pressure source 80 to the force bellows to counteract a predetermined portion of the load by exerting a force between the end cap 16 of the case 12 and the load link 28 of the load measuring element 20 to thereby permit the load measuring element 20 to continue to function within its normal service range with its usual accuracy. Calculations are made to relate the pressure exerted upon the face of the bellows to a force that is subtracted or added to the load applied to the load cell 10 for accurately indicating the value of the test load.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A load cell arrangement which is operative for precisely measuring loads over a range beyond the functional range of a single load cell and which comprises:

a hollow case having a top and bottom panel;

a load measuring element positioned within said case with a first end connected to the bottom panel of said case;

load transfer means connected to a second end of the load measuring element for coupling the load measuring element to a fixed reference;

load monitoring means for monitoring the amount of a load applied between the bottom panel of said case and said fixed reference and supplying an output signal indicating the amount of said load;

a source of fluid under pressure; and a variable force means interposed between the top pane of said case and said second end of the load measuring element for applying fluid under pressure from said source across said load measuring element, responsive to said output signal for counter acting the load exerted upon the load measuring element permitting said load measuring element to measure loads greater than said functional maximum load measuring range when said output signal indicates that the amount of said load applied between the bottom panel of said case and said fixed reference is approaching the maximum functional load range of said load cell measurement element.

2. The load cell arrangement of claim 1 wherein the load transfer means includes a plate secured to the second end of the load measuring element and at least one transfer rod that extends through an aperture in an end of the case for connection to the fixed reference.

3. The load cell arrangement of claim 1 wherein the load transfer means includes a plate secured to the second end of the load measuring element and a plurality of transfer rods that extend through apertures in an end of the case, a load adapter plate connected to the ends of the transfer rods extending through the case for coupling the load element to a fixed reference, and limit means to limit the load that may be applied to the load measuring element in either direction.

4. The load cell arrangement of claim 2 wherein the variable force means comprises a variable pressure bellows means interposed between the plated secured to the load measuring element and an end of the case so that when a load is applied to the load measuring element that would exceed a predetermined range a pressure may be applied by the bellows means to counteract a predetermined portion of the load.

5. The load cell arrangement of claim 4 wherein the variable pressure bellows means comprises at least one bellows device and a limit means is coupled to the load transfer means to limit the force that may be applied to the load measuring element in either direction to preclude overload of the measuring element.

6. The load cell arrangement of claim 5 wherein said load monitoring means comprises at least one electrical measuring arrangement coupled to the load measuring element for determining the load that has been applied to the load measuring element.

7. The load cell arrangement of claim 6 wherein the electrical measuring arrangement coupled to the load measuring arrangement includes a Wheatstone bridge circuit.

8. The load cell arrangement of claim 7 wherein a second electrical measuring device is coupled to the load measuring element for determining when a predetermined force has been exerted upon the load measuring element so that it is necessary for the variable force means to provide a force to counteract a portion of the load.

9. A variable load cell measuring arrangement for accurately measuring loads over a predetermined functional range comprising:
a load measuring element operative through a predetermined range that is connected to a load and at the other end to a fixed reference;
a case having a top and a bottom panel surrounding the load measuring element with the load measuring element connected to the bottom panel of said case;
variable pressure means interposed between the load measuring element and the top panel of said case;
a source of fluid under pressure; and
means to selectively supply said fluid under pressure to the variable pressure means when the load exceeds a predetermined limit so that the variable pressure means exerts a pressure directly opposing the test load thereby permitting the load measuring element to continue to function within the operative range.

10. The variable load cell measuring arrangement of claim 9 wherein the pressure source is selectively coupled to the variable pressure means for supplying a predetermined pressure to the variable pressure upon command.

11. The variable load cell measuring arrangement of claim 10 wherein control means is coupled to the pressure source and to the load measuring element for determining when the pressure source should supply fluid under pressure to the variable pressure means to permit the load measuring element to continue to function within its operative range.

12. The variable load cell measuring arrangement of claim 11 wherein an electrical circuit means is coupled to the load measuring means to provide an output signal proportional to the load exerted upon the load measuring element.

13. A method for accurately measuring loads applied to a load measuring element positioned in a case, said loads being greater than the functional range of a measuring element which comprises the steps of:
applying a predetermined load to said measuring element having a defined maximum functional load capability;
determining the load applied to the load measuring element; and
applying; when the load applied to the load measuring element exceeds said maximum load capability of said measuring element, a predetermined counter acting force to the casing surrounding said load measuring element in opposition to the load for permitting the load measuring element to continue to function above its maximum functional load capability.

14. The method of claim 13 wherein the step of determining the load applied to the load measuring element includes sensing the strain on the load measuring element and providing an electrical output proportional to the applied load.

15. The method of claim 13 wherein the step of applying a predetermined force opposing the load includes selectively applying pressure provided by a pressure means.

16. The method of claim 15 which further includes using an electrical output provided by the load measuring element to control the pressure means.

* * * * *